US011567903B2

(12) United States Patent
Mason, Jr. et al.

(10) Patent No.: US 11,567,903 B2
(45) Date of Patent: *Jan. 31, 2023

(54) VERSIONED FILE SYSTEM WITH GLOBAL LOCK

(71) Applicant: Nasuni Corporation, Boston, MA (US)

(72) Inventors: Robert M. Mason, Jr., Uxbridge, MA (US); David M. Shaw, Newton, MA (US); Kevin W. Baughman, Natick, MA (US); Christopher S. Lacasse, Grafton, MA (US); Matthew M. McDonald, Burlington, MA (US); Russell A. Neufeld, Newton Highlands, MA (US); Akshay K. Saxena, Natick, MA (US)

(73) Assignee: Nasuni Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,798

(22) Filed: Jun. 3, 2019

(65) Prior Publication Data

US 2020/0341949 A1 Oct. 29, 2020

Related U.S. Application Data

(63) Continuation of application No. 14/735,345, filed on Jun. 10, 2015, now Pat. No. 10,311,153.

(60) Provisional application No. 62/085,370, filed on Nov. 28, 2014.

(51) Int. Cl.
*G06F 16/176* (2019.01)
*G06F 16/182* (2019.01)

(52) U.S. Cl.
CPC ...... *G06F 16/1774* (2019.01); *G06F 16/1827* (2019.01)

(58) Field of Classification Search
CPC . G06F 16/275; G06F 16/1774; G06F 16/1827
USPC ......................................................... 709/217
See application file for complete search history.

(56) References Cited

U.S. PATENT DOCUMENTS

| 5,535,375 | A | * | 7/1996 | Eshel | G06F 16/1794 |
| | | | | | 703/27 |
| 6,324,581 | B1 | * | 11/2001 | Xu | G06F 16/1774 |
| | | | | | 709/213 |
| 7,313,557 | B1 | * | 12/2007 | Noveck | G06F 16/1774 |
| 9,213,717 | B1 | * | 12/2015 | Pawar | G06F 16/1774 |
| 9,491,241 | B1 | * | 11/2016 | Wan | G06F 16/1827 |
| 9,678,968 | B1 | * | 6/2017 | Taylor | G06F 11/1435 |
| 2005/0251500 | A1 | * | 11/2005 | Vahalia | G06F 16/1774 |
| 2007/0038697 | A1 | * | 2/2007 | Zimran | G06F 16/166 |
| | | | | | 707/E17.01 |
| 2012/0297450 | A1 | * | 11/2012 | Whittick | H04L 67/02 |
| | | | | | 709/217 |

(Continued)

*Primary Examiner* — Mahran Y Abu Roumi
(74) *Attorney, Agent, or Firm* — David H. Judson

(57) ABSTRACT

A versioned file system comprising network accessible storage is provided. Aspects of the system include globally locking files or groups of files so as to better control the stored files in the file system and to avoid problems associated with simultaneous remote access or conflicting multiple access requests for the same files. A method for operating, creating and using the global locks is also disclosed. A multiprotocol global lock can be provided for filing nodes that have multiple network protocols for generating local lock requests.

4 Claims, 15 Drawing Sheets

(56) References Cited

U.S. PATENT DOCUMENTS

| | | | | |
|---|---|---|---|---|
| 2012/0330894 A1* | 12/2012 | Slik | ............... | G06F 16/196 |
| | | | | 707/626 |
| 2013/0232310 A1* | 9/2013 | Kruus | ............... | G06F 12/16 |
| | | | | 711/162 |
| 2014/0025820 A1* | 1/2014 | Rawat | ............... | G06F 16/1774 |
| | | | | 709/225 |
| 2015/0356110 A1* | 12/2015 | Lin | ............... | G06F 16/122 |
| | | | | 707/704 |

* cited by examiner

VERSIONED FILE SYSTEM WITH GLOBAL LOCK

RELATED APPLICATIONS

This application is related and claims priority to U.S. Provisional Application No. 62/085,370 entitled, "Versioned File System with Global Lock" filed on Nov. 28, 2014, which is hereby incorporated by reference in its entirety.

TECHNICAL FIELD

The present application relates generally to data storage, and more particularly to locking files stored in a network-attached file system.

BACKGROUND

It is known to provide an interface between an existing local file system and a data store (e.g., a "write-once" store) to provide a "versioned" file system. The versioned file system comprises a set of structured data representations, such as XML. In a representative embodiment, at a first time, the interface creates and exports to a data store a first structured data representation corresponding to a first version of the local file system. The first structured data representation is an XML tree having a root element, a single directory (the "root directory") under the root element, zero or more directory elements associated with the root directory, and zero or more elements (such as files) associated with a given directory element. Each directory in turn can contain zero or more directories and zero or more files. Upon a change within the file system (e.g., file creation, file deletion, file modification, directory creation, directory deletion and directory modification), the interface creates and exports a second structured data representation corresponding to a second version of the file system. The second structured data representation differs from the first structured data representation up to and including the root element of the second structured data representation. Thus, the second structured data representation differs from the first structured data representation in one or more (but not necessarily all) parent elements with respect to the structured data element in which the change within the file system occurred. The interface continues to generate and export structured data representations to the data store, preferably at given "snapshot" times when changes within the file system have occurred. The data store comprises any type of back-end storage device, system or architecture. In one embodiment, the data store comprises one or more cloud storage service providers. As necessary, a given structured data representation is then used to retrieve an associated version of the file system. In this manner, the versioned file system only requires write-once behavior from the data store to preserve its complete state at any point-in-time.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

In an aspect, the invention includes a method of locking a shared file stored in a network-attached file system (NAS). The method includes intercepting a local lock request initiated by a user of a local file system, the local lock request for write access to the shared file. The method also includes translating the local lock request having a first local protocol to a global lock request having a common protocol. The method also includes sending the global lock request to a central lock server. The method also includes receiving a global lock for the shared file if the central lock server determines that the global lock is available.

The first local protocol can be Network File System (NFS), Server Message Block (SMB) or Common Internet File System (CIFS). In some embodiments, the method also includes intercepting a second local lock request initiated by a second user of a second local file system, the second local lock request for write access to the shared file, the second local lock request having a second local protocol, the second local protocol comprising Server Message Block (SMB) or Common Internet File System (CIFS). The method can also include translating the second local lock request having the second local protocol to a second global lock request having the common protocol. The method can also include sending the second global lock request to the central lock server. The method can also include receiving a multiprotocol global lock for the shared file if the central lock server determines that the multiprotocol global lock is available.

In some embodiments, the method includes creating a snapshot of a most recent version of the shared file. In some embodiments, the method includes marking a parent directory of the shared file as modified. The method can also include merging a file data for the shared file in a local cache prior to locking a file path of the shared file. The method can also include determining whether a network file data stored in a server is newer than a local file data stored in the local cache. The method can also include, prior to releasing the global lock, discarding the network file data if the local file data of the shared file is newer than the network file data of the shared file. The method can also include discarding the network file data if a lock_write_version of the shared file is less than a lock_push_version of the shared file. The method can also include merging the local file data with the network file data if a lock_write_version is greater than a lock_push_version.

In some embodiments, the method includes temporarily storing a local lock release request in a local lock cache. The method can also include reestablishing the global lock if a second local lock request is generated while the local lock release is stored in the local cache. The method can also include resetting an existing lock mode of the global lock if the new lock mode for the second lock request is different than the existing lock mode. The reset lock mode can be inclusive of an existing access level of the existing lock mode and a new access level of the new lock mode. The reset lock mode can be inclusive of an existing share level of the existing lock mode and a new share level of the new lock mode. The method can also include translating the local lock release to a global lock release having the common protocol; and sending the global lock release to the central lock server.

In some embodiments, the method includes updating a central lock database with an identity of the shared file associated with the global lock released by the global lock server. In some embodiments, the method includes determining whether a requested lock mode is available. The requested lock mode can include an exclusive write access or a shared write access. The method can also include determining if the requested lock mode is compatible with an existing lock mode for an existing global lock on the shared file. In some embodiments, determining if the requested lock mode is compatible with an existing lock mode comprises comparing the first local protocol associated with the global lock request with a second local protocol associated with the existing global lock.

In some embodiments, the method includes storing a new file request on the central lock server. The method can also include polling the central lock server for new files or new objects that have not been merged into the NAS. The method can also include merging a new file generated by the new file request into the NAS.

The method can also include promoting the local lock request to a write lock that allows read-only access to others users of the NAS. The method can also include honoring an access flag and a shared access flag associated with the local lock request. The method can also include initiating a lock peek when the user opens the shared file. In some embodiments, the lock peek comprises retrieving at least one of a file handle, a handle version, a first handle, and a lock push version. In some embodiments, the lock peek is retrieved from a local lock cache. In some embodiments, the lock peek is retrieved from the central lock server. The method can also include temporarily storing information retrieved from the lock peek in a local lock cache.

In another aspect, the invention includes a method for managing locks in a shared network-attached file system. The method includes receiving a first global lock request from a first node, the first global lock request comprising a first local protocol of a first local lock request generated by the first node. The method also includes providing a global lock to the first node. The method also includes receiving a second global lock request from a second node, the second global lock request comprising a second local protocol of a second local lock request generated by the second node, wherein the first protocol is different than the second protocol. The method also includes providing a multiprotocol global lock to the second node if the multiprotocol global lock is compatible with the first local protocol and the second local protocol.

In some embodiments, the first local protocol is Network File System (NFS), Server Message Block (SMB) or Common Internet File System (CIFS). In some embodiments, the first protocol is Server Message Block (SMB) or Common Internet File System (CIFS) and the second protocol is Network File System (NFS).

In another aspect, the invention includes an apparatus for managing file locks in a shared network-attached file system. The apparatus includes a first server comprising a processor, a network interface, a file system agent, and a lock daemon. The first server is in communication with a central lock server and a cloud-based storage via the network interface. The lock daemon is configured to translate a local lock request for a shared file in the shared network-attached file system to a global lock request, the local lock request having a first protocol, the global lock request having a common protocol. The file system agent is configured to create and export to the cloud-based storage one or more structured data representations of a local file system to generate a version of the shared network-attached file system.

In another aspect, the invention includes an apparatus associated with multiple filer entities, at least one of which creates and exports to a cloud data store one or more structured data representations comprising a shared versioned file system, the shared versioned file system accessible to each file entity, wherein filer entities do not interact with one another. The apparatus includes a processor and a computer memory storing computer program instructions executed by the processor. The program instructions instruct the processor to intercept a local lock request initiated by the filer entity, the local lock request for write access to a shared file in the shared versioned file system. The program instructions also instruct the processor to translate the local lock request having a first local protocol to a global lock request having a common protocol. The program instructions also instruct the processor to transmit the global lock request to a central lock server. The program instructions also instruct the processor to receive a global lock for the shared file if the central lock server determines that the global lock is available.

IN THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
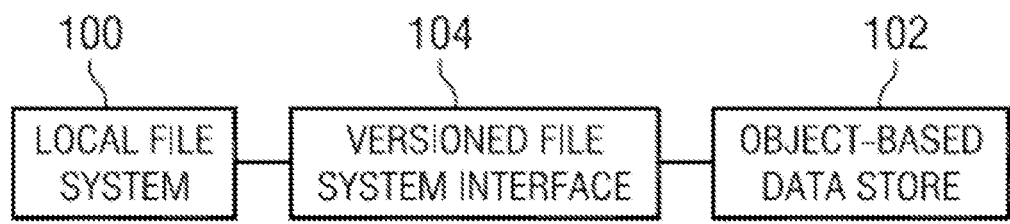
FIG. 1 is a block diagram illustrating how a known versioned file system interfaces a local file system to an object-based data store.

FIG. 1 illustrates a local file system 100 and an object-based data store 102. Although not meant to be limiting, preferably the object-based store 102 is a "write-once" store and may comprise a "cloud" of one or more storage service providers. An interface 104 provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired. The interface 104 provides for a file system that has complete data integrity to the cloud without requiring global locks. In particular, this solution circumvents the problem of a lack of reliable atomic object replacement in cloud-based object repositories. The interface 104 is not limited for use with a particular type of back-end data store. When the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent. In one embodiment, the VFS resides within a single storage service provider (SSP) although, as noted above, this is not a limitation. In another embodiment, a first portion of the VFS resides in a first SSP, which a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. A representative implementation is the Nasuni® Filer, available from Nasuni Corporation of Massachusetts. Thus, for example, typically the interface 104 is a rack-mounted server appliance comprising of hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMware®, or the like), as software executing in a server, or as software executing on the native hardware resources of the local file system. The interface 104 serves to transform the data representing the local file system (a physical construct) into another form, namely, a versioned file system comprising a series of structured data representations that are useful to reconstruct the local file system to any point-in-time. A representative VFS is the Nasuni Unity File System (UniFS®). Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

The interface 104 generates and exports to the write-once data store a series of structured data representation (e.g., XML documents) that together comprise the versioned file system. The data representations are stored in the data store. Preferably, the XML representations are encrypted before export to the data store. The transport may be performed using known techniques. In particular, REST (Representational State Transfer) is a protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
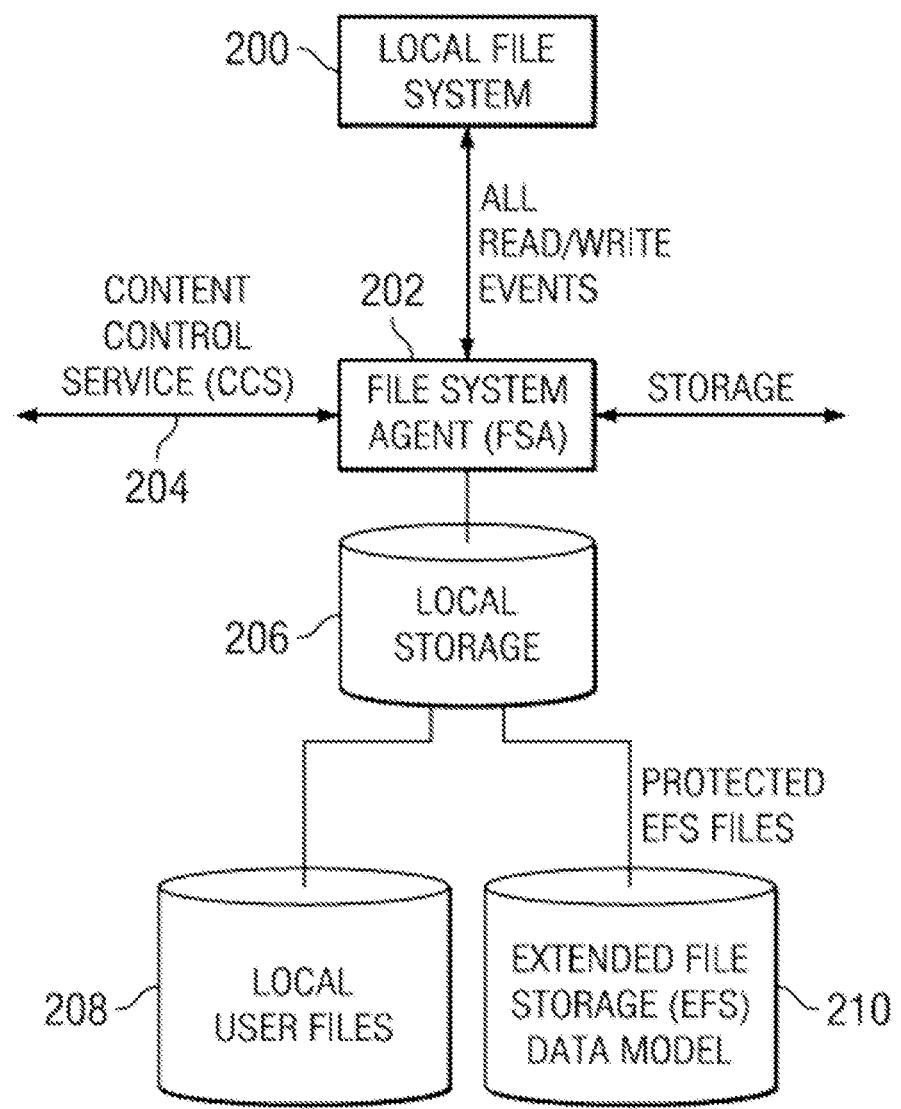
FIG. 2 is a block diagram of a representation implementation of a portion of the interface shown in FIG. 1.

FIG. 2 is a block diagram of a representative implementation of how the interface captures all (or given) read/write events from a local file system 200. In this example implementation, the interface comprises a file system agent (FSA) 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
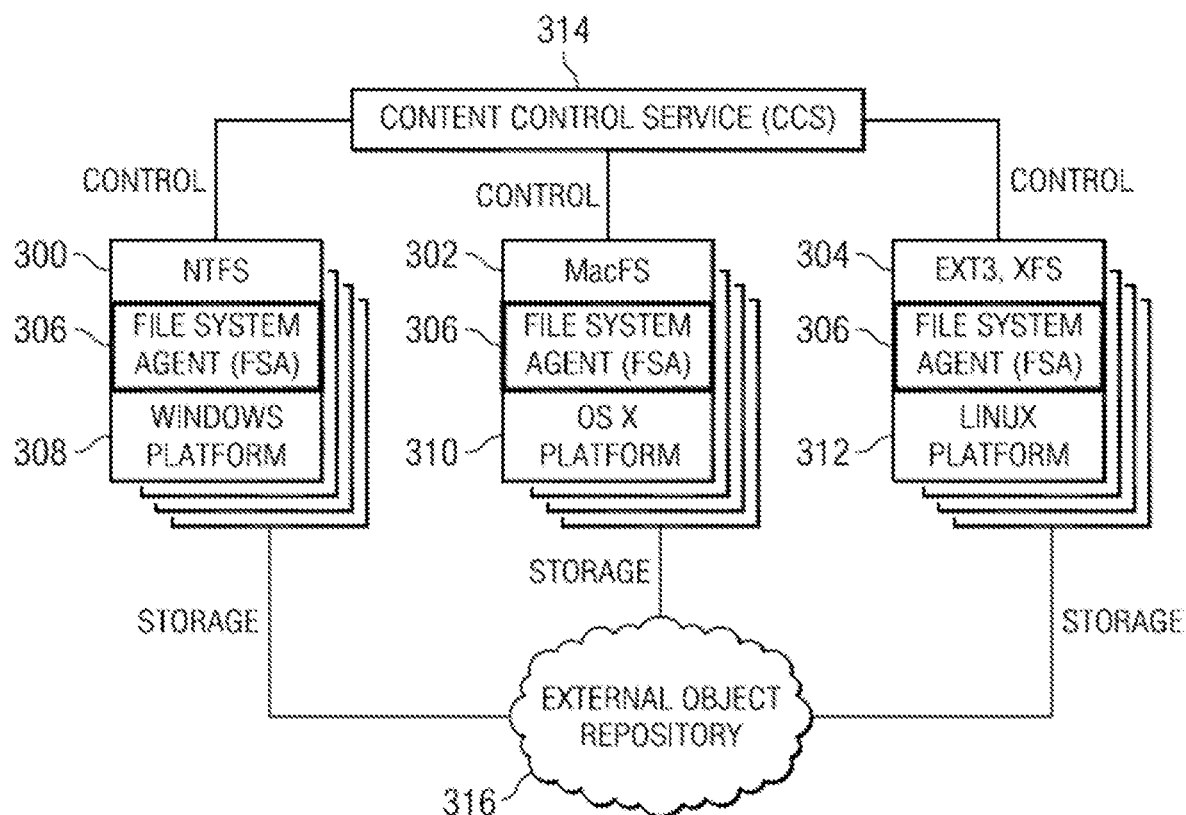
FIG. 3 is a more detailed implementation of the interface where there are a number of local file systems of different types.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS (also referred to as "HFS+" (HFSPlus)) 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
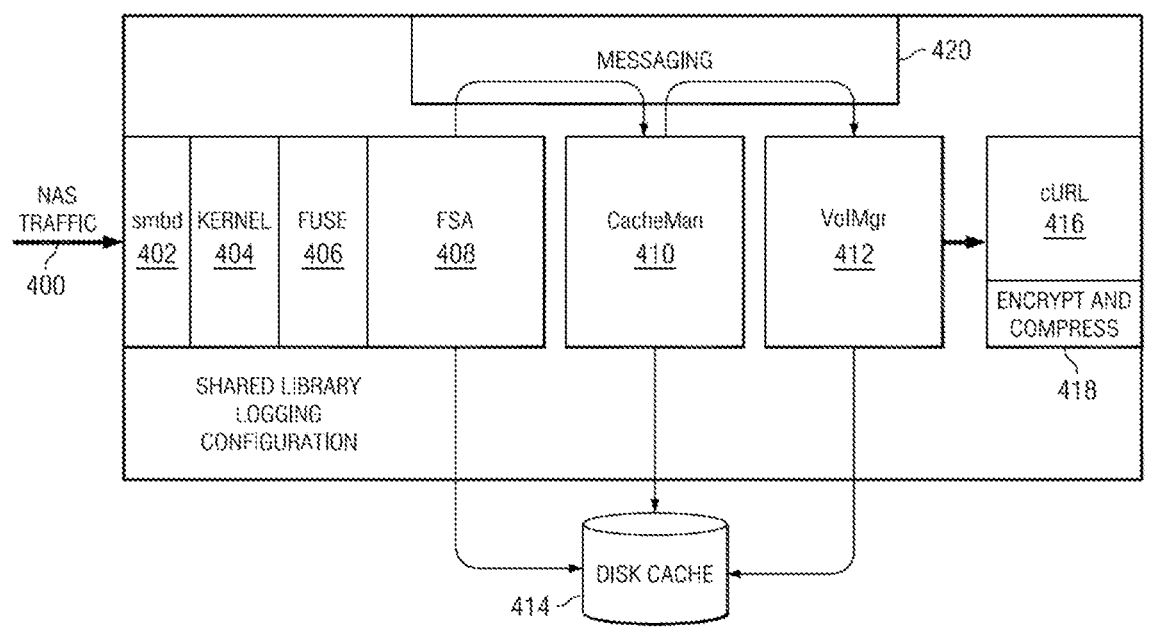
FIG. 4 illustrates the interface implemented as an appliance within a local processing environment.

FIG. 4 illustrates the interface implemented as an appliance within a local processing environment. In this embodiment, the local file system traffic 400 is received over Ethernet and represented by the arrow identified as "NAS traffic." That traffic is provided to smbd layer 402, which is a SAMBA file server daemon that provides CIFS (Window-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, preferably there is one file transfer agent instance 408 for each volume of the local file system. The cache manager 410 is responsible for management of "chunks" with respect to a local disk cache 414. This enables the interface described herein to maintain a local cache of the data structures (the structured data representations) that comprise the versioned file system. The volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. cURL is a library and command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

The interface shown in FIG. 4 may be implemented as a standalone system, or as a managed service. In the latter case, the system executes in an end user (local file system) environment. A managed service provider provides the system (and the versioned file system service), preferably on a fee or subscription basis, and the data store (the cloud) typically is provided by one or more third party service providers. The versioned file system may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store.

As described above, the file system agent 408 is capable of completely recovering from the cloud (or other store) the state of the native file system and providing immediate file system access (once FSA metadata is recovered). The FSA can also recover to any point-in-time for the whole file system, a directory and all its contents, a single file, or a piece of a file. These and other advantages are provided by the "versioned file system" of this disclosure, as it now described in more detail below.

Figure 5:
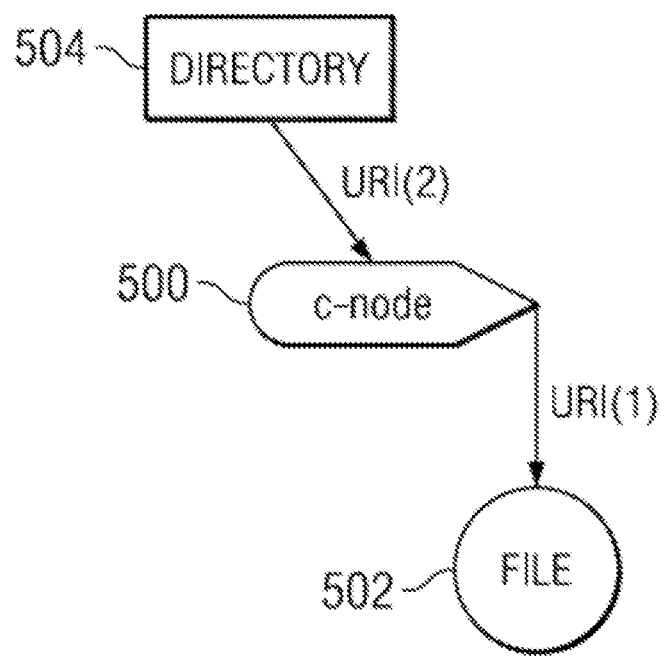
FIG. 5 illustrates a portion of a file system "tree" showing the basic component elements that are used to create a structured data representation of a "versioned" file system.

FIG. 5 is a representation of a portion of a tree showing the basic elements that are represented in a versioned file system according to one embodiment. The reference numeral 500 is a c-node (or "cloud" node). A c-node preferably contains all of the information passed by a file system agent instance about an inode (or inode-equivalent) local file system. As will be seen in the examples below, the inode subset of the c-node includes data that would be returned by a typical "stat" function call, plus any additional extended attributes that are file system-dependent. One or more remaining parts of the c-node are used to provide a CCS super-user with additional access control and portability across specific file system instances. States another way, c-nodes preferably act as super-nodes for access control to files and metadata. While the inode sub-structure contains information from the original local file system, c-nodes allow administrators of the system to gain access to files in a portable, file system-independent manner. Preferably, each c-node is addressable by a URI. A c-node preferably also includes a pointer to the actual location of the data file. C-nodes indicate where the remote copies of the item may be found in the data store. The reference numeral 502 is a data file. This object represents the file preferably as it was created in the local file system. One of the main benefits to isolating the metadata in the c-nodes is that a user's data files can be stored with no modifications. As in a traditional file system, preferably the name of the file is stored in the directory or directories that contain it and not as part of the file itself. Preferably, URIs (for the actual data files in the cloud) remain opaque to the end-users, although this is not a requirement. An FSA instance controls access to the data file URIs through the respective c-nodes. The reference numeral 504 is a directory. Directories are c-nodes that contain a simple list relating names to the corresponding URIs for other c-nodes that, in turn, point to other files or directories. Directories provide a convenient way to establish a namespace for any data set. There can be multiple directories that point to the same files or directories. The above-described approach can support hard links or symbolic links. Hard links are simply multiple name entries that point to the same c-node. A symbolic link is a name entry that contains another name inside; when resolving the link, the entry is read and the resolution process is then restarted using the inner name. Directories are owned by their own c-node, which preferably holds its metadata and controls access to it.

Figure 6:
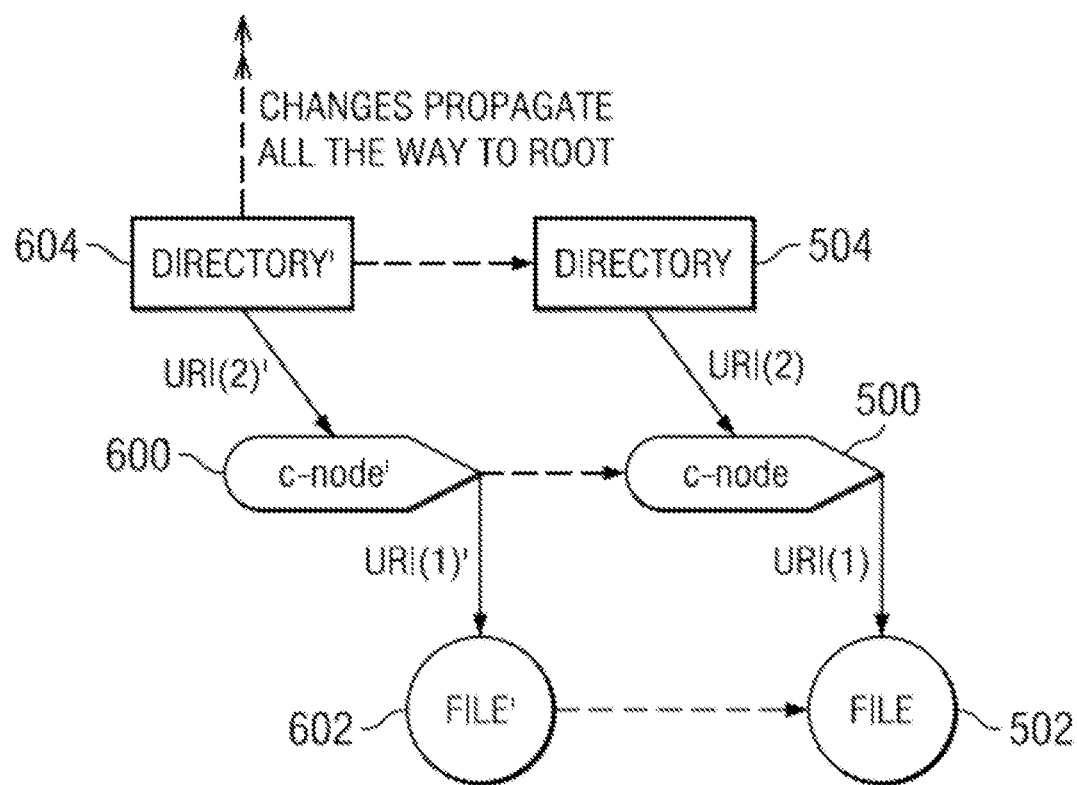
FIG. 6 illustrates the portion of the tree (as shown in FIG. 5) after a change to the contents of the file has occurred in the local file system.

FIG. 6 illustrates the portion of the tree (as shown in FIG. 5) after a change to the contents of the file 502 has occurred in the local file system. In this example, which is merely representative, a new version of the local file system is then created (preferably at a "snapshot" period, which is configurable). The new version comprises the file 602, the new c-node 600, and the new directory 604. As also seen in this drawing, the changes to the tree also propagate to the root. In particular, upon a given occurrence in the local file system (as will be described), a "new version" of the file system is created (for export to the cloud), and this new version is represented as a new structured data representation (e.g., a new XML document). As will be seen, the new structured data representation differs from the prior version in one or more parent elements with respect to the structured data element in which the change within the file system occurred. Thus, upon a change within the file system, the interface creates and exports to the data store a second structured data representation corresponding to a second version of the file system, and the second structured data representation differs from the first structured data representation up to and including the root element of the second structured data representation. In this manner, the interface provides for a "versioned" file system that has complete data integrity to the data store without requiring global locks.

The second structured data representation may "borrow" unchanged parts of the first structured data representation. Thus, the second structured data representation does not need to construct or even consider parts of the tree that were not changed; it just point to the same c-nodes that the first structured data representation does.

Figure 7:
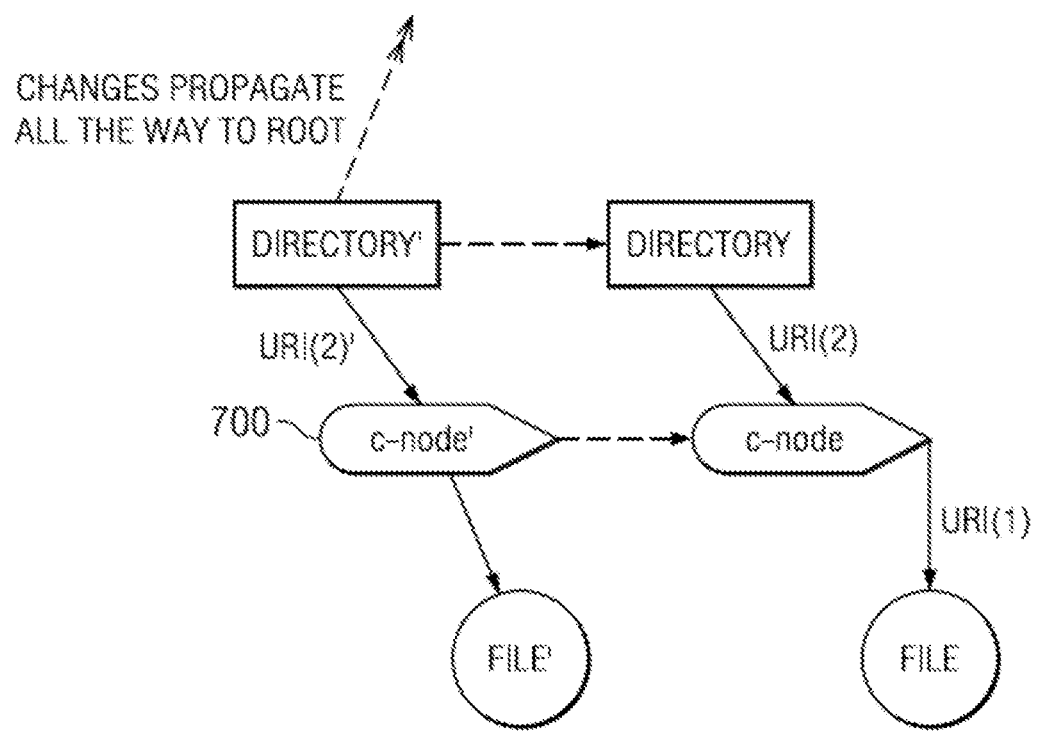
FIG. 7 illustrates the portion of the tree (as shown in FIG. 5) after a change to the contents of the c-node has occurred.
Figure 8:
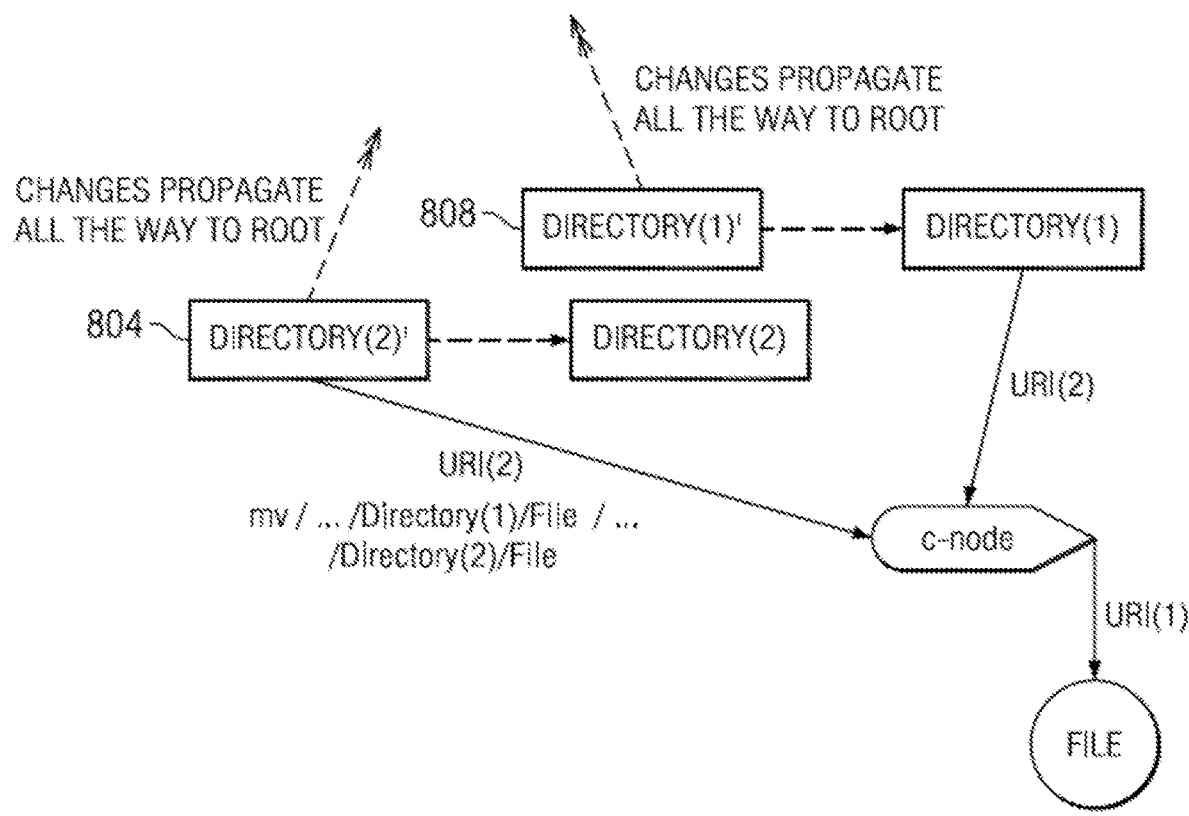
FIG. 8 illustrates the portion of the tree (as shown in FIG. 5) after a change to the contents of a directory has occurred.

FIG. 6 illustrates one type of change (a file update) that triggers the generation of a new version. FIG. 7 illustrates another type of change (an update to c-node 700) that also triggers the generation of a new version with changes propagated to root, and FIG. 8 illustrates yet another type of change (an update to each of the directories 804 and 808) that also implements a new version, once again with changes propagated to root. Generalizing, while the types of changes that trigger a new version may be quite varied, typically they include one of the following: file creation, file deletion, file modification, directory creation, directory deletion and directory modification. This list is representative.

Figure 9:
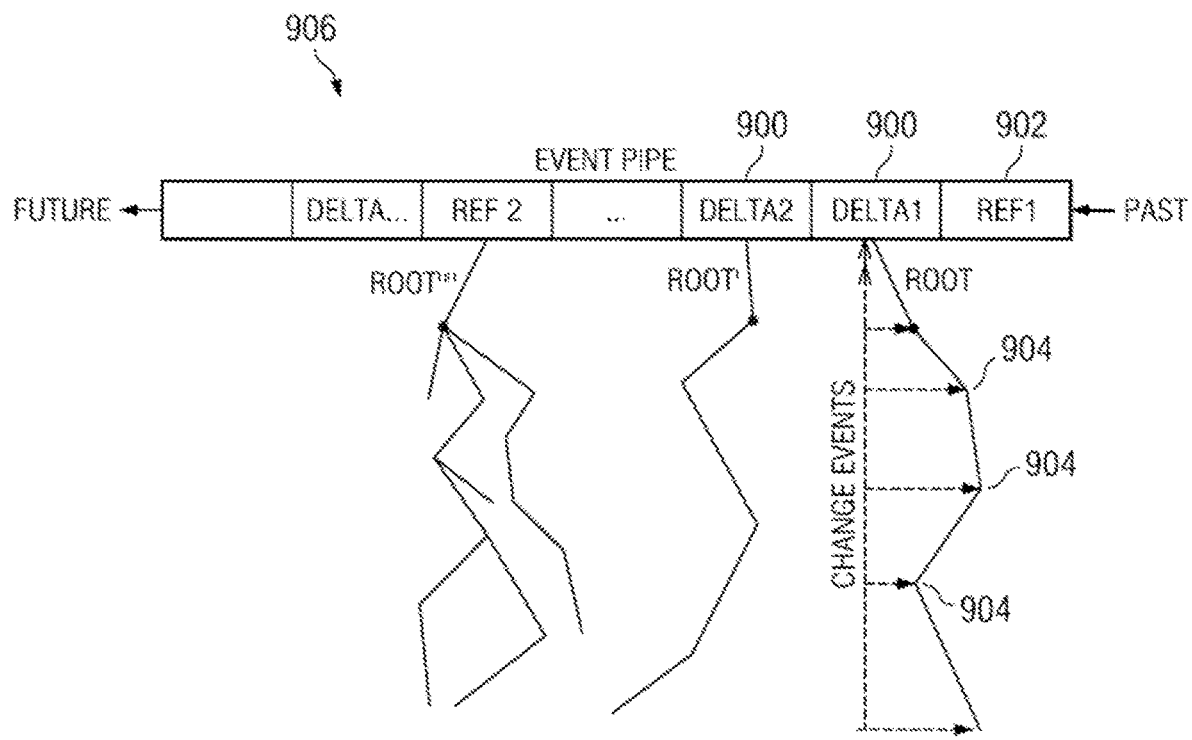
FIG. 9 illustrates how a number of file changes are aggregated during a snapshot period and then exported to the cloud as a new version.

Moreover, as noted, it is possible but not required that a new version be created at the time of the actual change in the local file system; typically, the new version is created after a "snapshot" of the local file system is taken, and a number of change events may occur during a given snapshot period. FIG. 9 illustrates this approach. As seen in this drawing, an FSA instance preferably aggregates all of the changes to the local file system in two ways: delta frames 900, and reference frames 902. The delta frames 900 control the number (and size) of the objects that need to be stored in cloud storage. As noted above, preferably every local file system event is recorded by the FSA instance as a change event 904. As noted, new inodes, directories and files trigger corresponding new entities (created by FSA) in the cloud; however, preferably modifications to existing structures create change events that are aggregated by FSA into a single new entity, the delta frame 900. A delta frame 900 starts with a new root that represents the current state of the file system. Preferably, the FSA instance compiles the delta frame information such that each of the new entry points (i.e. any modifications to the previous version) to c-nodes, directories and files are represented as new versions of the data structures plus pointers to the old structures. To reconstruct the current state of a local file system, an FSA client only has to walk a tree for any version to see all the correct items in the tree. Reference frames 902 are also compiled by FSA and contain an aggregation of the previous reference frame plus all the intervening delta frames.

A given reference frame 902 may be thought of as an entire copy with no references to previous versions, while a delta frame 900 may be thought of as including pointers to older versions. In other words, a delta frame logically is a combination of a current version and one or more prior versions. Each frame (reference or delta) may be considered a complete file system from a tree-walk perspective. This means that a walk of the tree, by itself, is all that is required to restore the file system (or any portion thereof, including a single file) to its associated state or point-in-time (as represented by the tree).

Preferably, by pointing to the same c-node that a previous version did, each version is complete in and of itself. There is no need to regenerate a "full" copy of a given version, as preferably each version is always full.

When it is desired to reconstruct the file system to a point in time (or, more generally, a given state), i.e., to perform a "restore," it is only required to walk (use) a single structured data representation (a tree). In other words, one and only one VFS tree may be used to identify a prior state of the local file system. It is not required to jump across multiple trees for this purpose.

Figure 10:
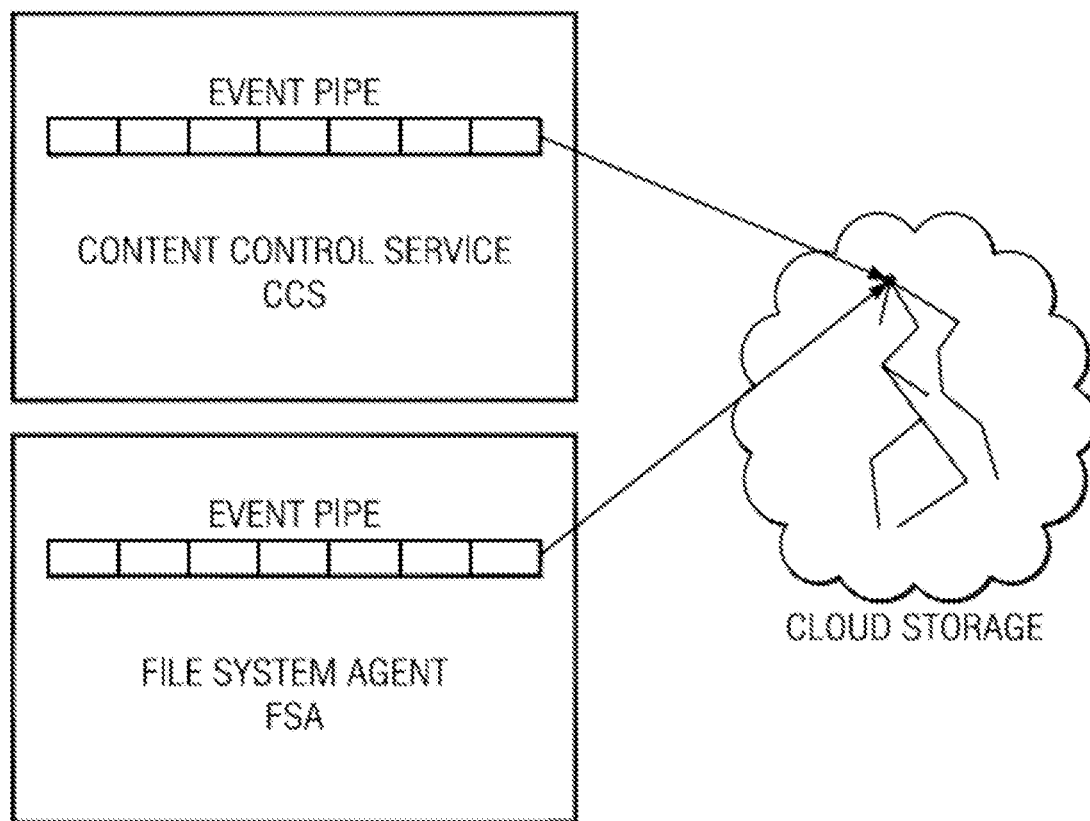
FIG. 10 illustrates how CCS maintains an event pipe.

Frames preferably are stored in an event pipe 906. As will be seen, the event pipe is implemented in a structured data representation as a table of contents (TOC), although this is not a limitation. Preferably, this data structure is held both at the FSA instance and at CCS, as illustrated in FIG. 10. The event pipe (with its entry points into cloud storage) is then the primary means to access all files stored remotely. In particular, one of ordinary skill in the art will appreciate that this is a lightweight data structure that preferably contains only versions of root for the given volume. Although it is desired that CCS be highly available, preferably the "writes" occur periodically in a transaction safe way as controlled by FSAs. The "reads" are only necessary when an FSA copy has failed; therefore, CCS can be run using an ordinary (high-availability) database or file-based back-end. Preferably, the mix of delta and reference frames in the event pipe is chosen to balance storage and bandwidth utilization against a practical recovery time for FSA to create a new local file system instance. The composition of the event pipe can also be set according to a configurable policy. For instance, users may choose to keep only so many versions or versions dating back to a specific date.

Figure 11:
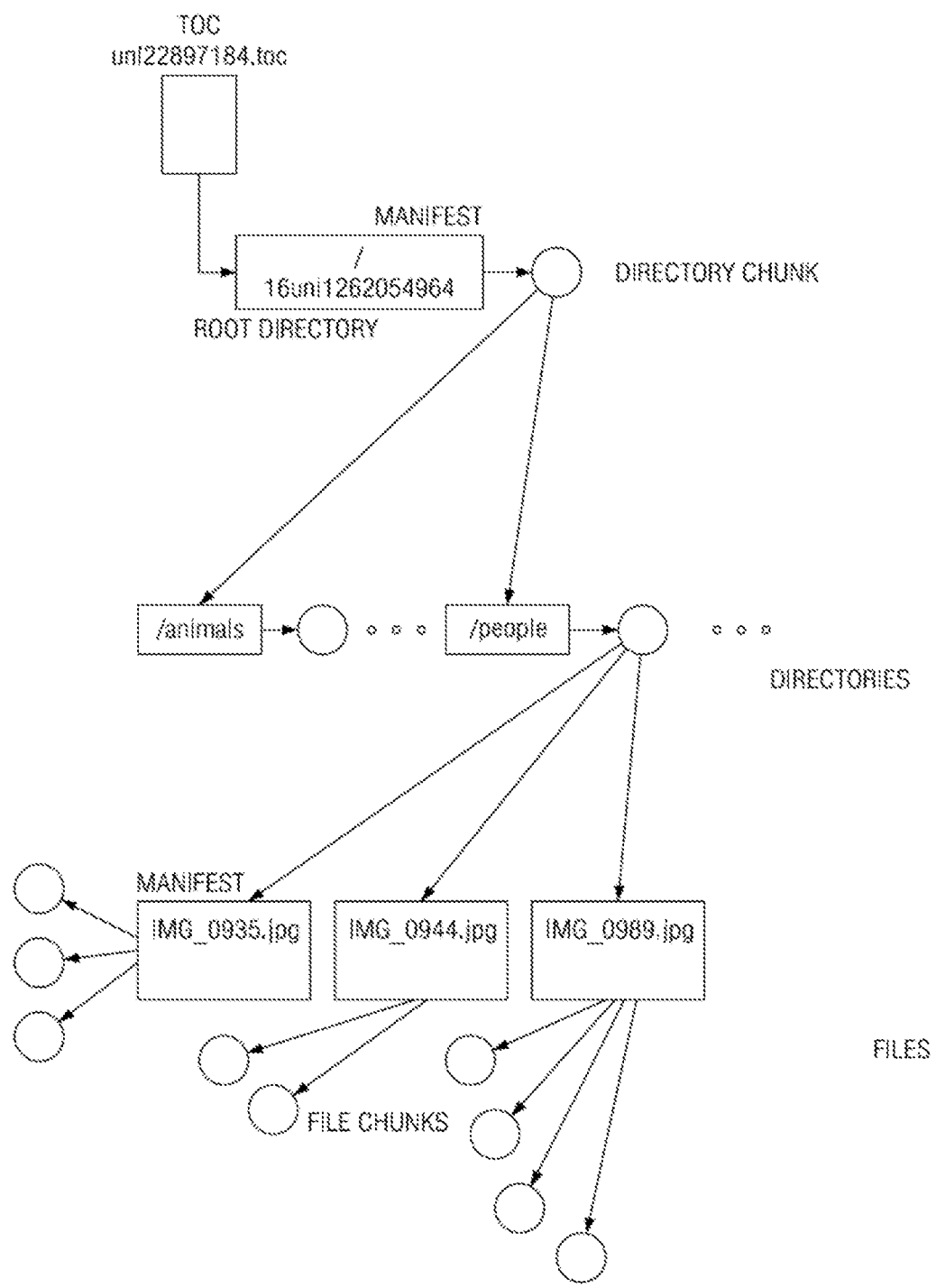
FIG. 11 illustrates a simple directory tree pushed to the cloud.
Figure 12:
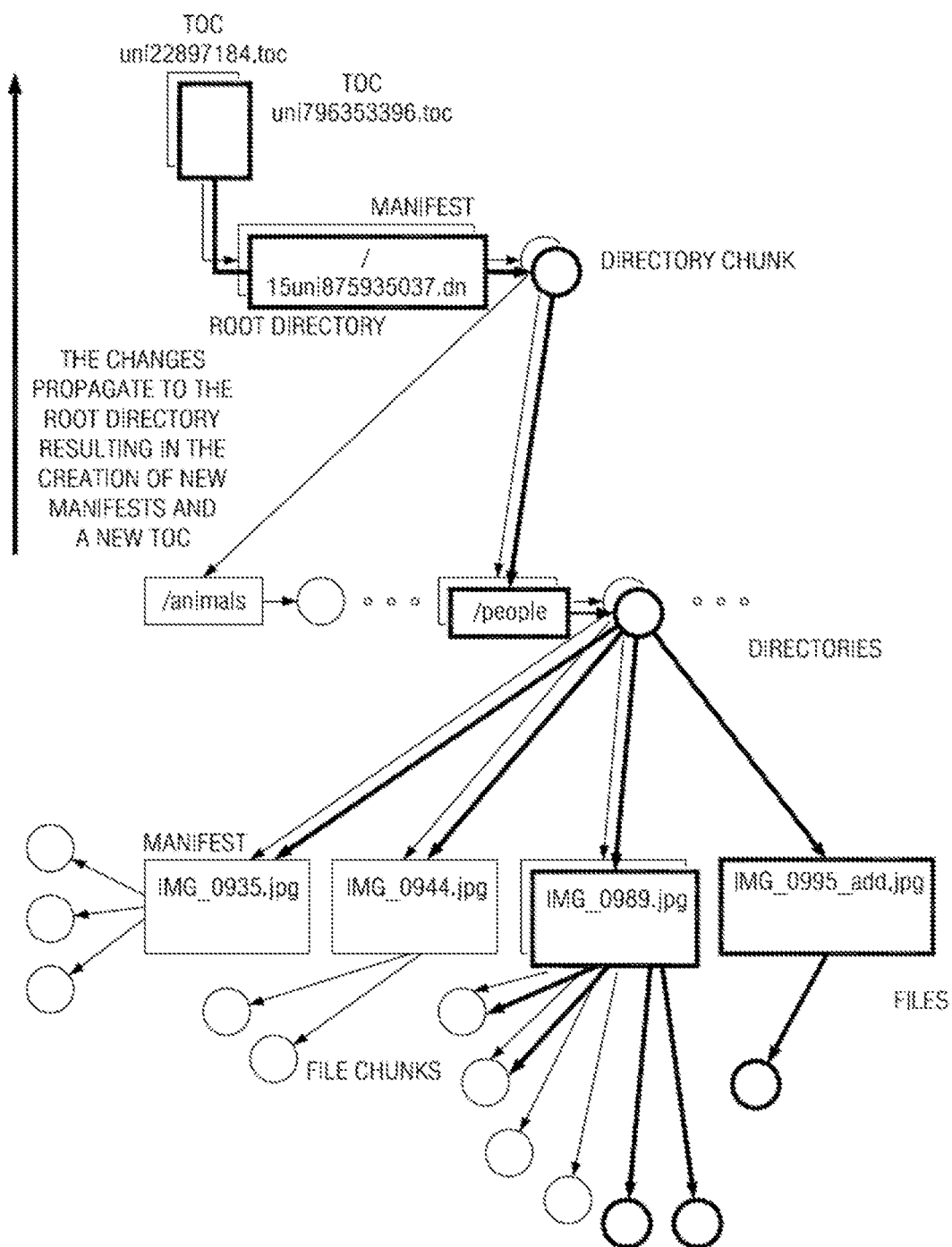
FIG. 12 illustrates the new version of that tree following several changes in the local file system.

FIG. 11 illustrates a directory tree in the cloud, and FIG. 12 illustrates the new version of that tree following several changes in the local file system. FIG. 11 is a simplified diagram. Because the data store is write-once, preferably a directory tree is pushed in two phases: phase 1 is all files (in any order), and phase 2 is all directories (in strict depth-first order). This allows a directory (in which the file or another directory is rooted) to be always written after the child file or directory is written. Other approaches may be used.

In a versioned cloud file system according to embodiment described in Ser. No. 14/483,030, filed Jul. 11, 2009, the disclosure of which is incorporated herein by reference, a versioned file system (VFS) comprises a set of structured data representations such as XML documents and document fragments. Names are object references that typically are not parsed by the system. The handle names typically have no relation to the actual file names or content. The handle names in the XML preferably are prefixed with a length component. Also, for items other than the table of contents (TOC), the path and version elements in the XML are informative and need not be used by the system. The "path" typically represents the originating path (in the local file system) when the item was last updated. The "version" typically represents the version of root at the time the item was last updated. The table of contents (TOC) is a table at the head of every version; preferably, the TOC contains references to all versions.

In the versioned cloud file system, each file is represented by a manifest object, and a series of chunk objects. The manifest object comprises a listing of the chunk objects that make up the file and each entry in the manifest preferably comprises a handle, an offset, and chunk length. The entry also preferably identifies a number of the version in which the chunk was created. A directory in the versioned cloud file system is represented in a similar manner (as is a file), with the contents of the directory being a series of directory entries. A directory entry also comprises a name, as well as other attributes for the file/directory, as well as the handle for the manifest that represents the contents of the file/directory. As described, a version is defined as the tree of objects rooted at a particular root directory manifest. A file-system table of contents (TOC) contains the handle of a latest root directory manifest, as well as a list of all previously root directory manifests. For each table of contents entry, there is also preferably stored a timestamp, version number, and a borrow window (as noted above, preferably an unsigned integer). In the versioned cloud file system, each of the objects is a write-once object, and versions often share objects (file/directory manifests, file/directory chunks).

Pruning a version means an operation starting from the root directory manifest for the version and deleting all objects in the tree are not referenced in another version. A difficulty in pruning is dealing with the situation where items from that version have been "borrowed" by other versions. Thus, for example, assume that a first version V1 is created upon a write of file A and a write of file B. Now, assume that a second version V2 is created upon a write file C and a delete of file B. If it is then desired to prune V1, it is not possible to do so by merely deleting all the objects that V1 references because File A is still being used (i.e., borrowed) by version V2. As noted above, such "sharing" of objects is a characteristic of the versioned file system. As a consequence, any pruning algorithm must take into consideration two (2) types of objects: (i) objects in the pruned version that have been referenced from previous versions and thus should not be purged (sometimes referred to as "borrowed" objects); and (ii) objects created in the pruned version that are referenced (restored) in later versions (sometimes referred to as "lent" objects). During pruning, any objects that are borrowed or lent are not purged.

During pruning, preferably the search for "lent" objects is constrained by the borrow window of the version to be pruned, and preferably the search for "borrowed" objects is constrained by the size of the borrow window of the version in which the borrowed object was created. Constraining the searches in this manner provides computational and storage efficiencies, as the approach obviates scanning all versions backwards and forwards and limits the searching just to the versions within the above-described windows.

A borrow window is associated to each of a set of versions in the versioned file system. A version is then pruned by deleting all objects in the tree associated with the version that, at the time of pruning: (i) are not being lent to any other version within the borrow window of the version being pruned, and (ii) are not referenced in any other version whose borrow window is sufficiently large enough such that an object in the version could have been restored from that other version. Another way of thinking about constraint (ii) with respect to a particular object in the tree associated with the version (being pruned) is that the object is deleted if it does not reside within the lending window of the version in which the object was created. If it is assumed that the borrow window of the version being pruned does not include the current version of the versioned file system, then the temporal limitation ("at the time of pruning") is not necessary, as all of the objects associated with the version being pruned either are borrowed or not (and this fact cannot change during the time the pruning is taking place). Thus, pruning of versions that are still available for borrowing into the current version is not recommended and, in one embodiment, is not permitted at all.

More generally, the prune algorithm deletes a version from the versioned filed system by deleting all objects in the tree associated with the version that are not referenced in any other version whose borrow window is sufficiently large such that an object in the version could be restored from that other version.

During a restore, preferably metadata is pulled back from the cloud first, so users can see the existence of needed files immediately. The remainder of the data is the pulled back from the cloud if/when the user goes to open the file. As a result, the entire file system (or any portion thereof, including a single file) can be restored to a previous time nearly instantaneously. The metadata appears first (and is stitched into the file system, where it remains available for immediate use), and then the cache gradually fills with the associated files as they are requested (and as they are streamed back from the cloud). From the user's perspective, however, it will appear as if the data is actually present (restored) once merely the metadata is returned.

A "fast" restore is said to be performed if an object being restored exists within a "borrow window" of the version from which the system is restoring. During a fast restore, the file (or, more generally, file system portion) being restored is associated into a new place in the file system, which results in two identifiers (e.g., filenames) within the file system pointing to the same (single) object. As noted above, the metadata for the file (or file system portion) being restored is pulled back from the cloud first, so users can see the existence of needed files immediately. The remainder of the data is then pulled back from the cloud if/when the user goes to open the file. This enables the file system portion to be restored to a previous time nearly instantaneously.

Typically, a restore is triggered by a user choosing to restore his/her/its data. In a representative embodiment, a user opens an interface (e.g., a web-based UI) and selects a file (data, time, snapshot, etc.) and selects a "restore" button. The system determines whether the restore will proceed on a "fast" basis based on a "borrow window." By way of brief background, each version in the versioned file system is identified as a particular version (typically by a version number) and has associated therewith a "borrow window," which preferably is an integer value. A most-recently created version is a "current" version. In the context of a fast restore operation, the borrow window of interest is the borrow window of the older version from which an object is being restored. As used herein, this construct is sometimes referred to as the "restore" borrow window. Each individual version has its own associated borrow window, and for a set of versions, each borrow window may be different. A "borrow window" is sometimes referred to as a "borrowing window" or "window."

If a user-initiated restore requires objects from a version outside the restore borrow window, the system performs a "slow restore" (with respect to versions outside the restore borrow window) to copy from an old version to the latest version as necessary. The word "slow" in the phrase "slow restore" does not necessarily have temporal implications; by definition, a "slow restore" is a state or status associated with a new file that just happens to have the same name and content as an older file. The metadata for a new file, like all new files, is available when the file is written.

In some embodiments, files can be shared across filer entities or nodes.

The above-described discussion associates an interface 104 with a particular versioned file system (VFS). An extension to this approach to enable "sharing" across multiple versioned file systems is now described. As used herein, "sharing" refers to the ability to provide full or partial read/write access at any time to any file/folder/volume owned by a particular filer (i.e. interface 104), or across multiple such filers. According to this approach, independent volumes are enabled to share data in the cloud.

Consider the case of two (2) filers that desire to do full read/write sharing of a single volume, where each of the filers uses an interface and creates a VFS as has been described above. In particular, Filer A has Volume-RW, and Filer B has Volume'-RW. Users of Filer A read and write Volume-RW as a normal file system, and users of Filer B read and write Volume'-RW as a normal file system. This type of operation has been described above. Now, according to the "sharing" technique herein, filers first register into a sharing group. Preferably, a web-based interface (or the like) is provided for this purpose, although any other convenient sharing group registration mechanism may be used. The registration interface includes or is associated with appropriate authentication and/or authorization mechanisms to ensure privacy and security, and that entities desiring to "share" independent volumes can manage their sharing appropriately. (Filers may also de-register from a sharing group using the web-based interface). At a start of each snapshot, a filer that has registered for a sharing group is provided (e.g., by the service provider or otherwise) a "snapshot lock" that is retained while a new version number is acquired. By definition, during this lock no other filers can snapshot. Once the new version number is acquired, the lock is released and the filer that acquires the lock does the following: (i) the filer then begins pushing data to the cloud; (ii) the filer completes the data push; (iii) the filer gets a metadata lock and then compares file system metadata (directories, structures, and so forth) between the local snapshot and the snapshot on the cloud using a merge algorithm; and (iv) the filer sends the changed metadata to the cloud and finally releases the metadata lock.

During the push (i.e. as all chunks and the file manifests, etc. are being pushed), optionally a notification is sent to all other members of the sharing group notifying them of new/changed files. In the embodiment where notification is used, the message typically includes only the cloud handle for the file manifest; all other information (e.g., the GUID of the filer that wrote the file, the path of the file in the namespace, etc.) can be learned from this manifest. Preferably, the sending filer only has to send once, and the notification message is replicated into a persistent message queue for each other filer in the sharing group. (Preferably, each filer in the sharing group has an associated message queue, although this is not a limitation).

Once notified, each other filer in the sharing group performs the following: if the version of the object is greater than its own version, the other filer inserts the new/changed file into its "now" current file system using the fast restore algorithm described above. If the version of the object is less than its own version, the other filer ignores the update. The use of notifications is optional and is not required.

In some embodiments, a reduced lock sharing approach can be provided.

As described, a simple technique to share a consistent fully-versioned file system (and, in particular, a "volume" therein) between or among multiple nodes (i.e., the filers in a sharing group) is to use a single distributed lock (the snapshot lock, as described) to protect each version of the file system. Preferably, this lock is then managed with one or more fairness algorithms to allow each node (filer) access to the shared file system volume to create its new version. While this approach works well, because each filer can only do work when under the lock, the one or more other filers (that do not have the lock) are essentially idle until they receive it. Accordingly, the aggregate bandwidth utilized by those in the sharing group may not be optimized.

Thus, a variant of the described approach is to reduce the period during which nodes in the sharing group operate under lock. This is sometimes referred to as "reduced lock sharing." Under this variant, and because data does not have to be sent to the cloud under lock, the lock is moved (i.e., delayed) so that it is not initiated until the metadata update phase. This allows for increased aggregate bandwidth to the cloud from all the nodes and faster responsiveness of the nodes in that the lock only occurs when the work (of sending the data to the cloud) is done and it is time to update the file system.

In some embodiments, non-preemptive sharing scheduling can be provided.

While reduced lock sharing is advantageous, one further issue that it does not address is responsiveness and visibility of new files to other nodes (other filers). Even if multiple nodes can send their data to the cloud concurrently (which reduced lock sharing permits), if the metadata (which is what enables the data to be visible to other filers) is only sent when all of the data is finished, then other filers may not see the data appear for an unacceptable time period. This can be addressed by another variant, which is referred to herein as "non-preemptive sharing scheduling." According to this further optimization, a data push to the cloud is broken up into two or more separate pushes. Each push then comprise a first phase, during which the data is sent to the cloud (but not under lock, as per the reduced lock sharing concept), followed by the metadata update (which occurs under lock) to tie the new files into the shared file system. In non-preemptive sharing, preferably a time limit is associated with the first phase to limit the objects pushed during the first phase.

An issue that may arise when non-preemptive sharing scheduling is implemented is that, because not all files are pushed, it is possible to be in an inconsistent file system state. For example, take a directory that contains two files, one of which was pushed, and one which was not. Pushing one file in that directory necessitates pushing that directory for the file to be visible to other filers, but at the same time, the directory must not be pushed unless all files it contains are safely in the cloud. Because of this conflict, the directory is in an inconsistent state. While it is permissible to push a directory with a mix of modified (but pushed to the cloud) and not modified files, it is not safe to push a directory containing files that were modified but not pushed to the cloud. Thus, to maintain consistent versioned file system semantics, limiting the objects pushed in the first phase also requires matching changes in what objects are pushed in the second phase.

Without limitation, the list of data objects for pushing from a particular node in the first phase can be chosen via any means desired (large files first, oldest files first, a mix, or the like), but optimally the chosen data objects are in as few directories as possible. Because all files in a given directory need to be pushed, this constraint simplifies the second phase metadata object choice later. Preferably, the first phase works against this list until the time limit is reached, after which the sending node stops sending new files and only permits files already started to complete. This ensures that, when this phase completes, while there are a number of files in the cloud that are not yet referenced by metadata (and perhaps a number of files that were not sent at all), there are no files that are split between the two states.

The time for the first phase to push is chosen to balance responsiveness and cost. The lower the number, the more responsive the system will be (that is, new data will be available to other filers sooner). The higher the number, the lower the cost and load will be (as there is a network, storage, and processing cost for all work done when pushing data).

Before the second phase starts, preferably there is a brief clean up phase (an intermediate phase between the first phase and the second phase) during which some extra data files may be pushed to the cloud to ensure that the file system is in a consistent state, so that the second phase can push up the metadata. For example, if a given directory had two dirty files in it, and the first phase had only pushed one, that would be an inconsistent file system, so the intermediate phase will push the other file in that directory to make that directory ready for the second phase. The intermediate and second phases preferably are done together and under the same lock. The intermediate phase may be though of as a part of second phase. When the second phase proper begins, the list of metadata objects for pushing are chosen to be the minimal set of metadata that encompasses the objects pushed in the first phase and the intermediate phase, combined with any metadata that has changed alone without a corresponding data change.

In some embodiments, a merge/push functionality can be implemented at each node that is participating in the sharing group.

Before a filer (a node) can begin to send data to the cloud (using the reduced lock sharing and/or non-preemptive sharing scheduling techniques described above), it is first necessary that the node have a consistent view of the volume into which the data is to be sent. In particular, each member of the sharing group must have the same view of the volume for sharing to be efficient and useful. To this end, a merge/push functionality is implemented at each node that is participating in the sharing group. That functionality is now described.

Thus, to share a fully-versioned file system between multiple nodes in a read-write fashion, asynchronous updates at each of the nodes is permitted, and each node is then allowed to "push" its individual changes to the cloud to form the next version of the file system. To present reasonably consistent semantics, before pushing its changes to create the next version, each node in the sharing group is required to merge the changes from all previous versions in the cloud that were created since the node's last push.

A push/merge cycle to generate a consistent local view of a volume (that is being shared in the cloud) is now described, by way of example. As described above, in a system of N nodes sharing read-write access to a single versioned cloud file system (i.e., a particular volume therein), changes to the file system are written locally to the cache at a node X. As also previously described, the nodes in the sharing group push their un-protected changes to the cloud, taking turns in doing so using the lock mechanism. Preferably, each push from a node X is staged from a point-in-time snapshot so that it is internally consistent. Each such push forms a new version of the versioned file system in the cloud. The changes pushed from node X are not visible at node X+1 (of the sharing group) until node X+1 sees the new version in the cloud and merges the changes from that version into its local cache. To be sure that changes from different nodes do not diverge, each node X is required to merge changes from all other nodes before pushing it changes to the cloud.

Permission to push changes to the cloud is granted by the acquisition of the lock as has been described. The lock can be implemented in a variety of ways. For an individual node, the sequence of steps in the cycle may be as follows. At step 1, the lock is obtained from the cloud (the service provider). The lock indicates what the version number of the next push should be, e.g., X. Then, at step 2, and for each version in cloud Y between a current version and version X, the changes of Y are merged into the local cache, and the current version is marked as Y+1. At step 3, a local snapshot of the cache is created, and the current version is marked X+1. Then, at step 4, all local dirty changes are then pushed from the local snapshot to the cloud as version X+1. The lock is then released at step 5 to complete the push/merge cycle.

To merge the changes from a cloud version X, the local filer must have merged all versions up to and including X−1. To merge a single directory from the cloud into the corresponding cache directory the following process is used:

1. First find all elements of the cloud directory that have a shared history with an element in the cache directory. As used herein, a "shared history" means that the two objects are derived from the same original object. Each element in the cloud can only share history with a single element in the cache.

2. For each object from the cloud that shares history with a cache element, if the cloud element is "cloud-dirty" then the object should be merged in. As used herein, a cloud element is "cloud-dirty" for a version X if either its data or metadata is newly written in version X.

3. To merge an element into the cache, the routine processes cache objects depending if they are "clean" or "dirty." If a cloud object is clean, it is overwritten with the cloud object. For stub objects, overwrite simply means that the handle and metadata can be overwritten. For non-stub files, handle and metadata should be overwritten and the file data in the cache should be made into a stub. For non-stub directories, the handle and metadata should be overwritten and the contents of the cloud directory should be (recursively) merged with the cache directory. If the cache object is dirty (a name change is necessary to make metadata dirty), the conflicts may be resolved as follows. For data/data conflicts (files), the cloud object comes in labeled as a conflicting copy of the file. For data/data conflicts (directories), the cloud directory contents are (recursively) merged with cache directory. For metadata/metadata conflicts, discard the cloud metadata change and keep the local metadata change. For metadata/data conflicts, overwrite the cache metadata with the new cloud metadata but keep the cache data. For data/metadata conflicts, overwrite the handle in the cache with the cloud handle, but keep the cache metadata (for files, the cache data should be stubbed; for directories, the cloud directory should be (recursively) merged with the cache directory).

4. Next, import all elements from the cloud directory that have no shared history with the cache elements. When importing, if the cache has an object with the same name if it is clean, it can be deleted before proceeding to import. When importing, if the cache has an object with the same name if it is dirty, import the cloud object under a "conflict" name.

5. Finally, delete all elements from the cache that did not have a shared history with an element in the cloud directory (unless the element is dirty). This completes the merge process.

To merge a whole tree, the above-described merge process is carried out on the root directory of the version to be merged. This may create additional directories to be merged. Directories are continued to be merged until there are no more directories remaining to be merged.

In some embodiments, an auto-fault algorithm can be implemented at the local node.

To facilitate usability, it is advantageous to populate the cache of the local node with changes that are being made to the versions in the cloud. In an example scenario, multiple users add data to their shares from multiple locations. When a remote office (part of the sharing group) wants to access the data, it may be necessary to fault the data from the cloud. This can be a time-consuming process that utilizes significant resources. To ameliorate this issue, an auto-fault algorithm may be implemented at the local node to pull data proactively (as a background process). The algorithm determines when new data is added to a volume (that is the subject of the sharing group) and begins faulting it in the background proactively. Therefore, when the user at the remote office attempts to access the data preferably it is already faulted into their local cache.

Preferably, the algorithm is triggered when merging a shared file system (in particular, a volume that is being shared). As the file system volume is compared for deletions, additions, or conflicts, the newly-replicated data is scheduled for so-called "auto-fault." The file system sends the data to be auto-faulted to an auto-fault manager, which then queues the fault. Preferably, the auto-fault function runs throttled in the background, and auto-fault requests are scheduled behind user requests. Auto-fault also allows data to be pushed to the cloud so snapshots can make progress and data replication can proceed un-interrupted. If an auto-fault is scheduled and the data is requested by the user, the auto-fault request is re-scheduled and the user request is serviced without delay. All prefetch associated with the auto-fault request will also be treated as a user request.

Preferably, auto-fault is called as part of the merge process, and it helps to provide better responsiveness of shared data, especially in the case of thinly-provisioned distributed system.

The above-described techniques provide significant advantages, the foremost being the ability to share independent volumes that are established by distinct filers. This conserves storage space in the cloud, does not require the use of shadow volumes, does not require snapshots to alternate between or among filers, facilitates near-live sharing of files even before a snapshot is complete, maintains synchronous snapshot of file system capability, and enables multiple volumes to have independent histories without twice the data being persisted in the cloud.

The filers may be anywhere geographically, and no network connectivity between or among the filers is required (provided filers have a connection to the service).

Sharing enables multi-site access to a single shared volume. The data in the volume is 100% available, accessible, secure and immutable. The approach has infinite scalability and eliminates local capacity constraints. The sites (nodes) may comprise a single enterprise environment (such as geographically-distributed offices of a single enterprise division or department), but this is not a requirement, as filers are not required to comprise an integrated enterprise, though practical limitations (e.g., security) can dictate whether multiple enterprises can share access to a common file system. This enables partners to share the file system (and thus particular volumes therein) in the cloud. Using the service provider-supplied interfaces, which are preferably web-based, the permitted users may set up a sharing group and manage it. Using the sharing approach as described, each member of the sharing group in effect "sees" the same volume. Thus, any point-in-time recovery of the shared volume is provided, and full read/write access is enabled from each node in the sharing group.

In some embodiments, a global lock can be provided.

The technique described above provides for multiple-site/ multiple-filer access to the same NAS namespace. The described model is such that the cloud is the center for all storage and operations, and the filer typically is at the edge at customer sites providing access to the data. In the above-described model, none of the appliances/devices communicate with each other directly. Rather, preferably all communication is through the highly scalable, fault-tolerant cloud provided by a particular service provider (e.g., Amazon, Microsoft, or the like), and over standard Internet connections (with no special requirements). This "hub and spoke" model allows for wide distribution of data throughout the world with many devices concurrently accessing the data without reliance on any specific sites or connections for the stability of the entire system. The model has also provided high-performance access, and reliable data distribution and sharing.

While each filer typically offers standard NAS protocol locking for local users collaborating on files and documents, in the above-described model typically those locks are not extended to other sites/locations.

The following provides for further extension of these techniques. This extension is referred to herein as "global lock" or "global locking." As will be seen, this approach provides for the ability to collaborate on a portion of the documents across multiple filers/sites. Such collaboration requires the local protocol locks to be extended through the system, providing global lock functionality. Locks can prevent clashes or corruption when multiple users attempt to write to the same file concurrently. The word "global" is not intended to be limiting.

In the global lock approach herein, preferably lock management is centralized even though the file systems do not communicate with each other. The lock functionality operates at a very high speed, and at large scale (e.g., millions or billions of files). Also, data can move through the system faster than traditional snapshot/synchronization process flow.

Global locking can be achieved with the following extensions to the versioned file system approach described above: extending locks to the service, providing a centralized lock manager in the cloud, allowing for individual file snapshot, synchronization, merge cycles to ensure that current data is always available upon lock grant, configuration of locks preferably at a folder-level granularity, and/or the ability of administrators to break locks when appropriate.

One way to achieve Global Locking is to extend local locks to a centralized global lock manager in the cloud. This can be done by intercepting local lock requests and transforming those requests into a common lock protocol that can be centrally managed in a global lock server. Local file lock requests are generated by a local computer and sent to a server when opening a shared file. The local file lock request can vary in form depending on the network protocol used by the operating system on the local computer, for example to communicate with a network-attached file system (i.e., NAS). For example, the network protocols Server Message Block (SMB) or Common Internet File System (CIFS) generate file lock requests using a first protocol. Similarly, the network protocol Network File System (NFS) generates file lock requests using a second protocol. These protocols are generally incompatible and need to be interpreted differently. One skilled in the art will recognize that alternatives to SMB, CIFS, and NFS can be used, and such alternatives are within the scope of this disclosure. For example, the Web Distributed Authoring and Versioning (WebDAV) protocol can be used to communicate with the NAS. Additional protocols include Delta-V and Apple Filing Protocol (AFP), though this list is not exhaustive.

Figure 13:
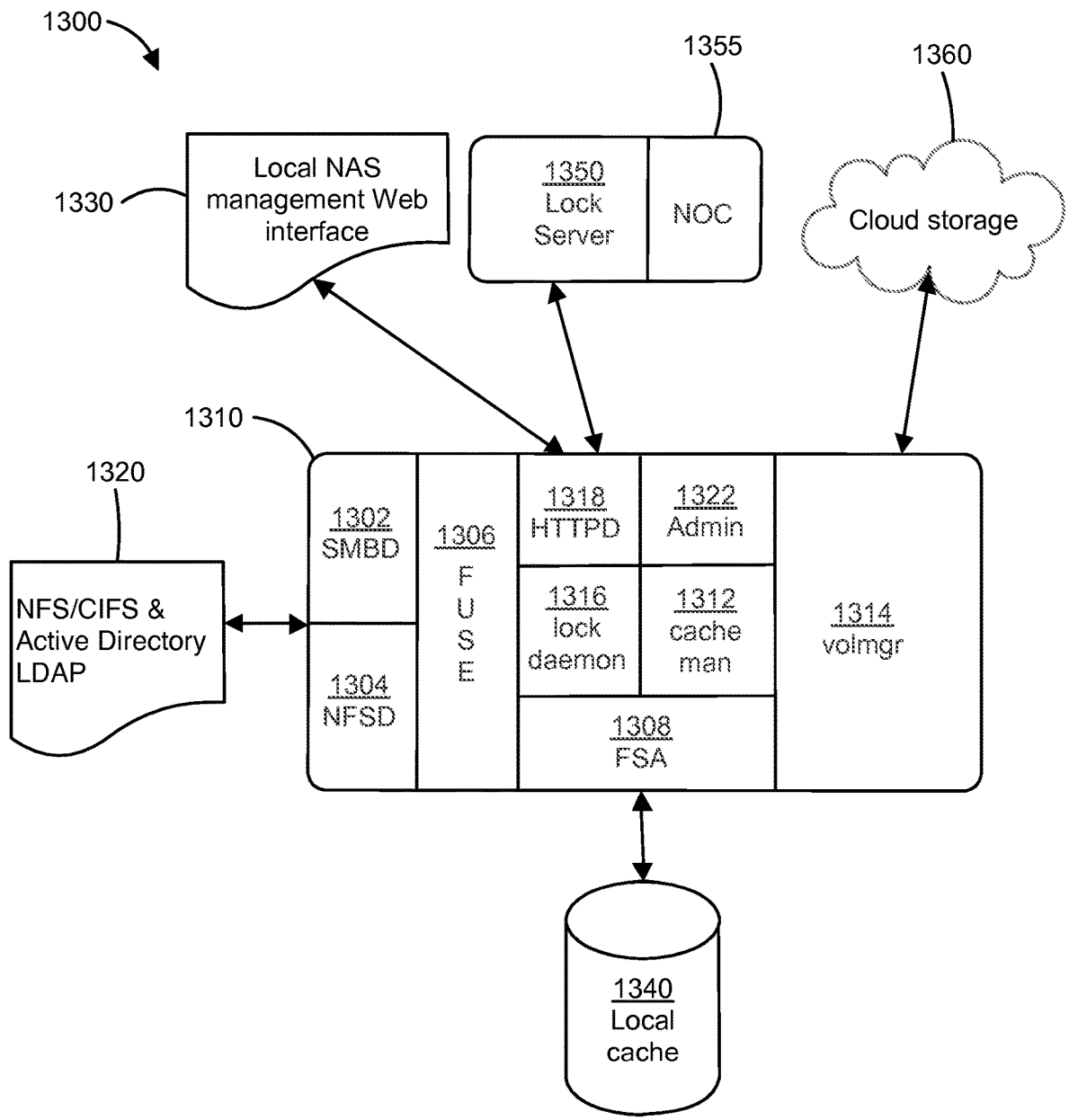
FIG. 13 illustrates a system for managing a versioned file system that includes the capability of global locking.

FIG. 13 is a block diagram that illustrates a system 1300 for managing a versioned file system that includes the capability of global locking. The system 1300 includes an interface 1310 in communication with local traffic 1320, a web-based portal 1330, a local cache 1340, a lock server 1350, and cloud storage 1360. The interface 1310 includes a SMBD layer 1302, a NFSD layer 1304, a FUSE module 1306, a FSA 1308, a cache manager 1312, a volume manager 1314, a lock daemon 1316, a transport layer 1318, and an administrative module 1322. In some embodiments, the interface 1310 is the same as the interface described with respect to FIG. 4 but with the addition of the lock daemon 1316.

SMB/CIFS lock requests are intercepted by SMBD layer 1302, which is a SAMBA file server daemon. An optional Virtual File System (VFS) module can extend the SAMBA server daemon to send the local lock information to the FSA 1308. FSA 1308 then communicates with FUSE 1306 to coordinate the FUSE file descriptors (pointers) with the ioctl information to determine a path for the given file(s) associated with the lock request. Assuming a path is enabled for global locking, FSA 1308 sends the lock and path to the lock daemon 1316, which handles the lock request as described below. If a path is not enabled for global locking, the lock request stays within the SAMBA server as it did previously (e.g., conflict management, etc. as described above) and it is not sent to the lock daemon 1316.

NFS lock requests are passed through the NFSD layer 1304 to FUSE 1306. Assuming a path prefix is enabled for global locking, FSA 1308 communicates with the lock daemon 1316 to handle the lock request using a common protocol, as described above. If the path prefix is not enabled for global locking, FSA 1308 handles the lock request as it did previously (e.g., conflict management, etc. as described above) and the lock request is not sent to the lock daemon 1316.

The lock daemon 1316 is responsible for local lock management and coordinating with the global lock server. The lock daemon 1316 can perform one or more of the following functions: (a) translating the lock format; (b) communicating with the centralized lock server; (c) acquiring locks; (d) lock peeking; (e) lock re-acquiring; (f) lock releasing; and (g) communicating with UniFS®.

With respect to translating the lock format, the lock daemon 1316 can translate the local file lock requests to a common lock format understood by the centralized lock server 1350 (described below). Using this approach, the lock server 1350 receives a lock request in one format regardless of the underlying network protocol (e.g., SMB/CIFS or NFS). The centralized lock server 1350 can be in a network operations center (NOC) 1355.

The lock daemon 1316 can then communicate with the centralized lock server 1350 by making calls to a Centralized Lock API. Through the API, the lock daemon 1316 can execute a lock request, an unlock request, and/or a lock break request. A lock request generally requires the transmission of certain information such as the first handle (a unique identifier to the original base object for the file), the requested lock mode, the file path, the protocol of the requester, etc. Additional information such as timestamps and serial number can be included in the lock request. The requested lock mode is the type of access for the lock, such as a shared or exclusive lock, a lock for read, a lock for write, lock for exclusive write, lock for shared write. If the centralized lock server 1350 grants the lock request, the lock server 1350 then uses information provided in the lock request (e.g., the first handle) to retrieve the latest version of the requested file from cloud storage 1360. The centralized lock server 1350 transmits the latest version of the requested file to the lock daemon 1316, which can store the file in local cache 1340.

An unlock request can include the same or similar information as the lock request but with an updated handle name that was generated as a result of modifications to the locked file. A lock break request can be provided by a system administrator to manually unlock a file (e.g., if a user leaves a locked file open overnight, a server goes down, etc.).

Prior to making a new lock request, the lock daemon 1316 determines whether a lock already exists in local cache 1340 or on the centralized lock server 1350. If no lock exists in either of those locations, the lock daemon 1316 acquires a new lock through the centralized lock server 1350. The new lock can have a lock mode computed using the requested access and share profiles (masks).

Lock peeking can be initiated every time a file is opened for read. In lock peeking, the lock daemon 1316 can query whether a lock exists on the file prior to opening the file. If a lock exists, the lock daemon 1316 can also determine the associated lock mode to evaluate whether the lock mode permits the user to open the file. The lock daemon 1316 retrieves this information from local lock cache 1340 if the filer requesting the lock peek already has a write lock on the file. Otherwise, the lock daemon 1316 retrieves this information from the centralized lock server 1350. Each lock peek request can be cached in the local lock cache 1340 for a short time period (e.g., several seconds) to reduce traffic to the central lock server 1350 if the lock daemon 1316 receives a new lock peek request shortly after the first lock peek request.

For example, another user may have a lock for exclusive write access to the file that does not allow any shared access (i.e., no shared read access). In this example, the lock daemon 1316 determines from the lock query that the file cannot be opened due to an existing lock on the file. In another example, the lock mode can allow shared read or write access in which case the lock daemon 1316 determines from the lock query that the file can be opened.

During lock peeking, the lock daemon 1316 can also retrieve additional information about the file, such as the file handle, handle version, firsthandle, and lock push version. The file handle is a pointer to the latest version of the file in the cloud. The handle version is a version of the file in the cloud. The firsthandle provides a unique identifier to the file across versions and renames of the file. The lock push version is the latest version of the file that was sent to the cloud.

The lock deamon 1316 can cache locks and unlocks in a local lock cache 1340 for release to the centralized lock server 1350. If a lock request is made for a file that has a cached unlock request, the lock can be reestablished without having to acquire a new lock from the centralized lock server 1350. In such a situation, the unlock request is cancelled. This caching can reduce load on the lock server 1350 and improve response time. In general, the unlock requests are cached for a certain period of time prior to release to the lock server 1350 to allow for such lock reestablishment.

In some embodiments, the lock in cache can be fully reset with a new lock mode calculated from the requested access and share masks in a new lock request. If there are outstanding locks, the new lock request could result in a partial lock reset to a new mode. The new mode in the partial lock reset can be calculated from an access mask that is inclusive of the existing and new access masks and from a share mask that is the least common denominator between the existing and new share masks. Such a partial lock reset can occur if the new lock mode is different from the existing lock mode, for example if the existing lock mode is shared while the new lock request is for an exclusive lock.

A new lock request can cause a lock downgrade or upgrade depending on the existing and new lock modes. For example, a lock downgrade can occur if the lock request has an access mask less than or equally permissive than its current access mask and its shared mask is less than or equally restrictive than its current share mask. The lock daemon 1316 can cache downgrade requests since applications commonly upgrade or downgrade lock modes on files in rapid succession. In addition, a lock can be downgraded when it is cached for release. Instead of releasing the lock in local cache 1340 the lock is reacquired with the new mode (access mask or shared mask). Before the lock is downgraded, the current data can be sent to the cloud so that it's available for the next locker. A lock can also be downgraded when it is not in cache for release. This can occur when an unlock doesn't completely reset the lock mode (e.g., a shared mode lock is unlocked but another lock still exists on the file). In this case, the lock is downgraded with the outstanding mode still on the lock. It also helps keep unlocks completely asynchronous by allowing lock caching.

A lock upgrade can occur for locks that do not meet the lock downgrade conditions described above.

Figure 15:
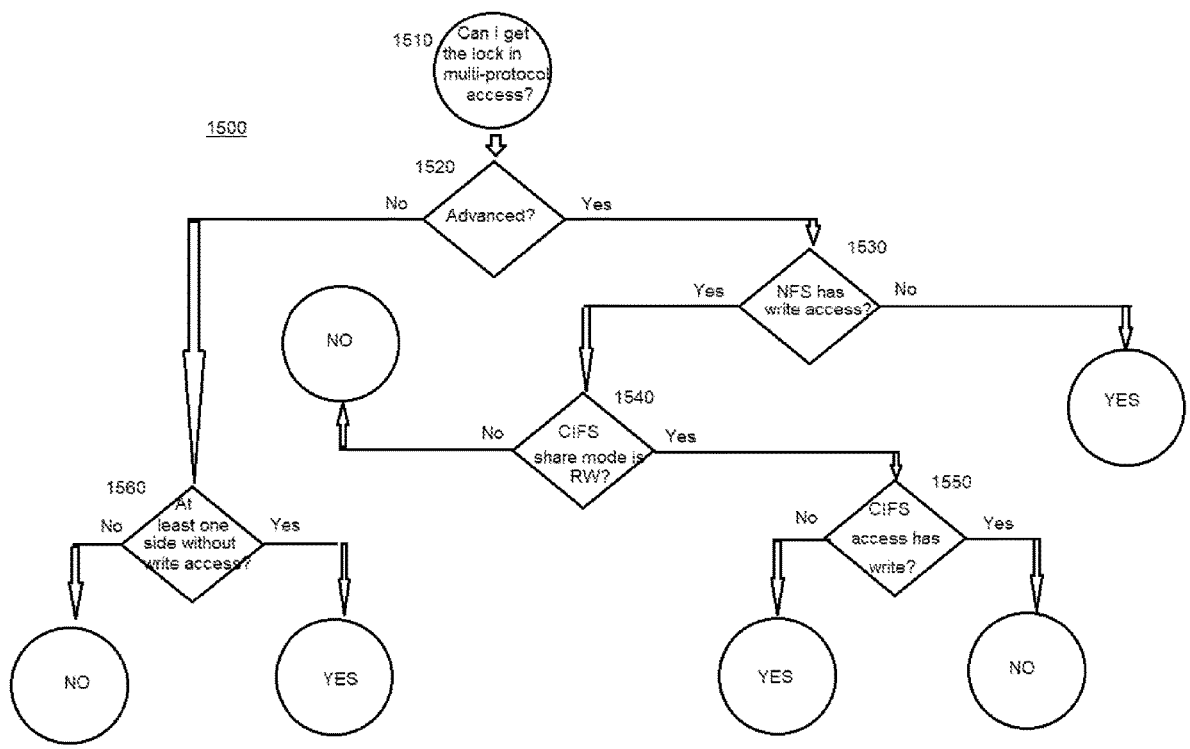
FIG. 15 illustrates a flow chart for determining whether a multi-protocol lock may be granted according to an embodiment.

As discussed above, the lock request includes information on the protocol (e.g., SMB/CIFS or NFS) of the requester and the lock mode. The lock server 1350 receives this information and can determine, based on any existing lock (s) on the requested file, whether the lock server 1350 can issue multiple locks on the same file. The lock server 1350 can evaluate the protocol used by the requester of the existing lock and the associated access/share permissions of that lock and determine whether protocol used with the new lock requester is compatible. An exemplary flow chart of the logic that can be employed by the locker server 1350 when evaluating such lock requests is illustrated in FIG. 15.

At 1510, the lock server has received a lock request for a file that has an existing lock as described above. The requester is using a first protocol (e.g., CIFS) and the user of the existing lock is using a second protocol (e.g., NFS). The lock server determines whether a multi-protocol lock is available using the flow chart 1500. At 1520, the lock server determines whether the existing lock is using an "advanced" lock mode, as described below. If so, at 1530 the lock server determines whether the user of the existing lock is using the NFS protocol with write access to the locked file. If the NFS protocol with write access is not used, a multi-protocol lock can be granted. If the NFS protocol with write access is used, the lock server determines 1540 whether the new requester is using the CIFS protocol with read/write access. If the new requester is not using the CIFS protocol with read/write access, a multi-protocol lock cannot be granted. If the new requester is using the CIFS protocol with read/write access and 1550 the new requester is using the CIFS protocol with write access, a multi-protocol lock cannot be granted. However, If 1550 the new requester is using the CIFS protocol without write access (i.e., read-only access), a multi-protocol lock can be granted. If at 1520, the existing lock is not using "advanced" mode and 1560 at least one user does not have write access to the locked file, a multi-protocol lock can be granted. However, if at 1520, the existing lock is not using "advanced" mode and 1560 a write lock has already been granted, a multi-protocol lock cannot be granted.

In addition, the lock daemon 1316 handles lock releases. In some embodiments, the lock daemon 1316 does not immediately send the lock release to the lock server 1350. This time delay can reduce load on the centralized lock server 1350 because files are frequently locked and unlocked in rapid succession, as discussed above. Before a lock is released, if the file was changed, the current data is sent to cloud storage 1360 (e.g., Amazon S3, Microsoft Azure, or other public or private clouds) so the most recent data is available to the next locker.

Finally, the lock daemon 1316 can communicate with the FSA 1308. The lock daemon 1316 can receive lock requests and/or lock peek requests from FSA 1308, which the lock daemon 1316 translates into a common protocol for transmission to the centralized lock server 1350, as discussed above. The lock daemon can also pass the updated handle name to the FSA 1308 to perform a file-level snapshot before unlocking a file and/or a file level merge/synchronization before locking a file.

In order for global locking to be successful, it is desirable for the locker to have the most recent version of the file associated with the lock request (and lock grant). To accomplish this, the cache manager 1312 can be configured to snapshot a single file (e.g., the file associated with the lock request) without triggering a copy-on-write (COW) event (which would cause a version update, as discussed above) and without affecting other snapshot operations. After a single file snapshot, the cache manager 1312 can mark all parent directories of the file as changed or "dirty." In addition, the fault manager algorithm can be configured to fault a single file based on requests from the FSA 1308.

The merge/push algorithm can be modified to provide for merging single files. Before the locked file is pushed to the local cache 1340, the NOC 1355 assigns a unique lock version (e.g., 64 bit) to the file. The lock version can be used by FSA 1308 to determine whether a locked file or its metadata is dirty (i.e., changed). The parent directories of the locked file can continue to use the existing write version assigned from the last TOC. Thus, FSA 1308 can track two values: lock_write_version and lock_push_version. When a file or directory is dirtied, the lock_write_version is updated. When a file or directory is pushed to local cache 1340, the lock_push_version is updated.

As discussed above, the file data from the NOC 1355 (or centralized lock server 1350) is merged into the local cache 1340 before the FSA 1308 returns control of the file to the client. To determine if the file data in the NOC 1355 is newer than the file data in the cache 1340 (e.g., if the lock is retrieved while an unlock request is cached), the FSA checks MAX (lock_write_version, lock_push_version) against the NOC lock version. If the NOC lock version is greater than the lock_write_version and the lock_push_version, the file data (object metadata and data) from the NOC 1355 is used to instantiate the object (locked file) in the local cache 1340. If the file data in the cache 1340 is newer, then the file data from the NOC 1355 is discarded. In the circumstance where the NOC 1355 indicates that the file is deleted, the delete version is compared to the local cache 1340 version in order to apply the delete to the local cache 1340.

In addition, the merge/push algorithm can be modified to reconcile the single-file merges of locked files with the snapshot merges of files. Any file that was "fastsynched" through the FSA 1308 (i.e., locked) or "fastpushed" to the cloud (i.e., unlocked) is designated as "cloud fastsynced." When merging an object or file that is considered "cloud dirty" or "cloud fastsynched," the FSA 1308 will update the file if the incoming lock_push_version is greater than MAX (lock_write_version, lock_push_version), as discussed above. If the incoming lock_push_version is less than MAX (lock_write_version, lock_push_version), the cache object is considered newer and the incoming update is discarded by the FSA 1308. Also, when a file is missing (deleted) from the pushed version but the file is also locally fastsynched, the file will not be deleted. This merging can occur concurrently or before the global lock on the file is granted.

In addition, if a file has been deleted or renamed, the local cache metadata can record a "delete tombstone" which includes certain information (e.g., parent firsthandle, lock version, name, etc.). FSA 1308 merges a file as new if the file is newer than any delete tombstone contained in the cache for the unique file. This can address the situation in which a file has been fast synchronized before merge. In that case, the incoming cloud dirty file is old compared to the cache and the import is discarded.

To ensure that the unlocked file includes the changes from the latest version, the locked file can only be unlocked when the lock_push_version is greater than or equal to the lock_write_version at which point the FSA 1308 sends the lock_push_version back to the NOC 1355 (or centralized lock server 1350) to store the new version of the file in cloud storage 1360.

In some embodiments, the interface 1310 snapshots and merges new files at the time of creation. The new file requests can be stored on the lock server 1350 with the lock entries. Other users can poll the lock server 1350 to determine if new files/objects exist that have not yet been populated to the cloud 1360, for example if there are new files/objects in a given directory. After the new files have been created, the locker server 1350 can merge the new file requests into the appropriate directories in the cloud 1360.

Figure 14:
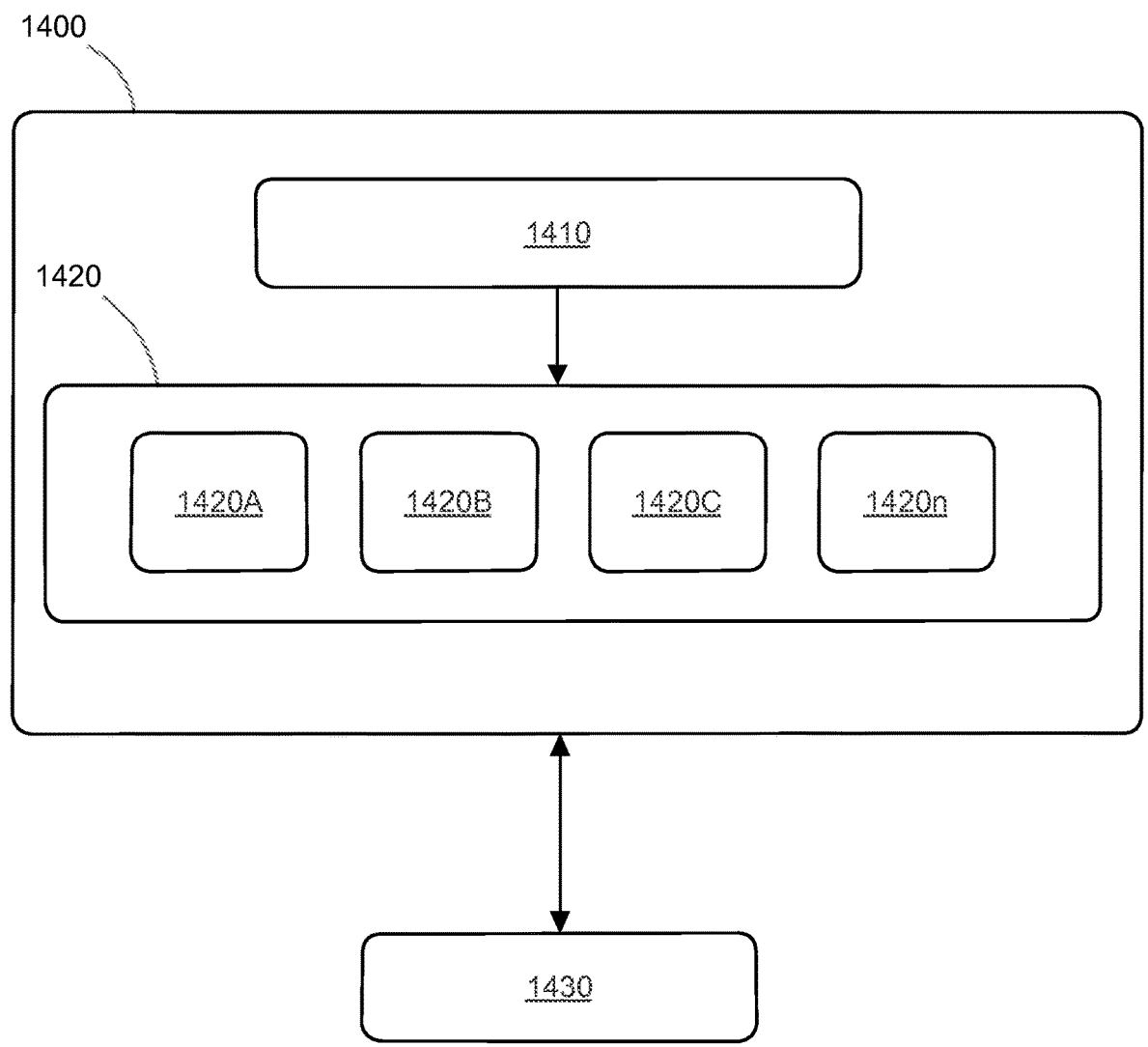
FIG. 14 illustrates a global lock server according to an embodiment of this disclosure.

FIG. 14 is a block diagram of a centralized lock manager 1400. The lock manager 1400 includes a load balancer 1410 and lock server 1420. The load balancer 1410 can distribute the lock/unlock requests over a number of lock servers 1420A, 1420B, 1420C, 1420n. In some embodiments, the load balancer 1410 is based on the AWS Elastic Load Balancing service available from Amazon Web Services, Inc.

The lock servers 1420 are deployed in the cloud and can be scaled up or down depending on demand. The lock API servers 1420 execute the centralized lock API functions and provide the logic for the lock manager 1400 (e.g., lock grants/denies, when to allow/deny a lock request, what lock modes can be provided in response to a lock request, tracking of the handles, cleaning the lock database 1430 periodically from old entries that are no longer tracked by anyone, etc.). The lock servers 1420 are in communication with the load balancer 1410, as discussed above.

The lock database 1430 is a central database in communication (e.g., over the Internet) with the lock manager 1400. The lock database 1430 can store information on files that are in the locked state. For example, the lock database 1430 can store, for each locked file, the lock state, the first handle, the owner, etc. When the lock database 1430 receives a lock request for a file that is already being tracked by the database 1430, the database 1430 can return the current handle if the current version of the file remains in cloud storage (i.e., if the file is not locked by another user). When the files are unlocked, their state is updated and an updated current handle is provided in the database 1430. The lock database 1430 can be scaled up or down with the load on the active locks.

In some embodiments, multiple global locking modes can be provided. In a first mode (e.g., an "optimized" mode), all lock requests are elevated to write locks that allow read-only access to users other than the locker. Such a mode can be implemented for SMB/CIFS and NFS without VFS. The first mode provides a "coarser" lock and is best suited for applications that do not rely on shared access modes (e.g., text editors, Microsoft Office, etc.). In the second mode (e.g., an "advanced" mode), global lock honors the access and shared access flags from SAMBA, which can allow multiple users to hold locks on a file at a given time. In some embodiments, the second mode is only available with SMB/CIFS. The second mode provides a "finer" lock and is best suited for applications that rely on shared access mode (e.g., AutoCAD Revit®).

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein. The present materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A method for managing locks in a shared network-attached file system, the method comprising:
   receiving a first global lock request from a first node, the first global lock request comprising a first local protocol of a first local lock request generated by the first node;
   providing a global lock to the first node, the global lock being a write lock that allows read-only access to users others than a locking user associated with the first node;
   receiving a second global lock request from a second node, the second global lock request comprising a second local protocol of a second local lock request generated by the second node, wherein the first protocol is different than the second protocol; and
   responsive to receipt of the second global lock request from the second node, determining whether a multi-protocol global lock distinct from the global lock can be returned to the second node, wherein a determination is based in part on evaluating whether an application associated with the second global lock request operates in a shared access mode by which multiple users are permitted to hold locks on a file at a same time;
   providing the multiprotocol global lock to the second node when the application operates in the shared access mode; and
   providing the global lock to the second node when the application does not operate in the shared access mode.

2. The method of claim 1 wherein the first local protocol is Network File System (NFS).

3. The method of claim 1 wherein the first local protocol is Server Message Block (SMB) or Common Internet File System (CIFS).

4. The method of claim 3 wherein the second local protocol is Network File System (NFS).

\* \* \* \* \*